United States Patent
Van Lange et al.

(10) Patent No.: US 12,365,776 B2
(45) Date of Patent: Jul. 22, 2025

(54) PROCESS FOR PRODUCING FOAM ARTICLE

(71) Applicant: Dow Global Technologies LLC, Midland, MI (US)

(72) Inventors: Sophie Gina Martha Van Lange, Eindhoven (NL); Jozef J. I. Van Dun, Horgen (CH); Miguel Albertodejusus Prieto, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 56 days.

(21) Appl. No.: 18/253,333

(22) PCT Filed: Nov. 23, 2021

(86) PCT No.: PCT/US2021/060510
§ 371 (c)(1),
(2) Date: May 17, 2023

(87) PCT Pub. No.: WO2022/115426
PCT Pub. Date: Jun. 2, 2022

(65) Prior Publication Data
US 2023/0407030 A1    Dec. 21, 2023

Related U.S. Application Data

(60) Provisional application No. 63/117,551, filed on Nov. 24, 2020.

(51) Int. Cl.
*C08J 9/00* (2006.01)
*B29C 44/08* (2006.01)
(Continued)

(52) U.S. Cl.
CPC ........... *C08J 9/0023* (2013.01); *B29C 44/083* (2013.01); *C08J 9/103* (2013.01); *B29K 2023/08* (2013.01);
(Continued)

(58) Field of Classification Search
CPC ............ B29K 2023/08; B29K 2096/04; B29K 2105/041; B29K 2105/24;
(Continued)

(56) References Cited

U.S. PATENT DOCUMENTS 9,956,732 B2    5/2018    Murphy et al.
2010/0237527 A1*   9/2010    Wu ................. B29C 44/445
                                521/84.1
(Continued)

FOREIGN PATENT DOCUMENTS

EP      3459723 A1      3/2019
WO   2014/009579 A1      1/2014
(Continued)

OTHER PUBLICATIONS

Jiang et al. "Advances in Polyolefin Foaming Technology", International Polyolefins Conference, Feb. 2019 (Year: 2019).*
(Continued)

*Primary Examiner* — Galen H Hauth
*Assistant Examiner* — Ariella Machness
(74) *Attorney, Agent, or Firm* — Boyle Fredrickson S.C.

(57) ABSTRACT

The present disclosure provides a process. In an embodiment, the process includes providing a foamable composition. The foamable composition includes an ethylene-based elastomer, a blowing agent, and a peroxide. The process includes heating the foamable composition to form a pliable formulation. The pliable formulation has (i) a viscosity (0.1 rad/s at 180° C.) from greater than 70,000 Pa·s to 2,000,000 Pa·s, (ii) a tan delta (0.1 rad/s at 180° C.) from 0.2 to less
(Continued)

Figure 1:
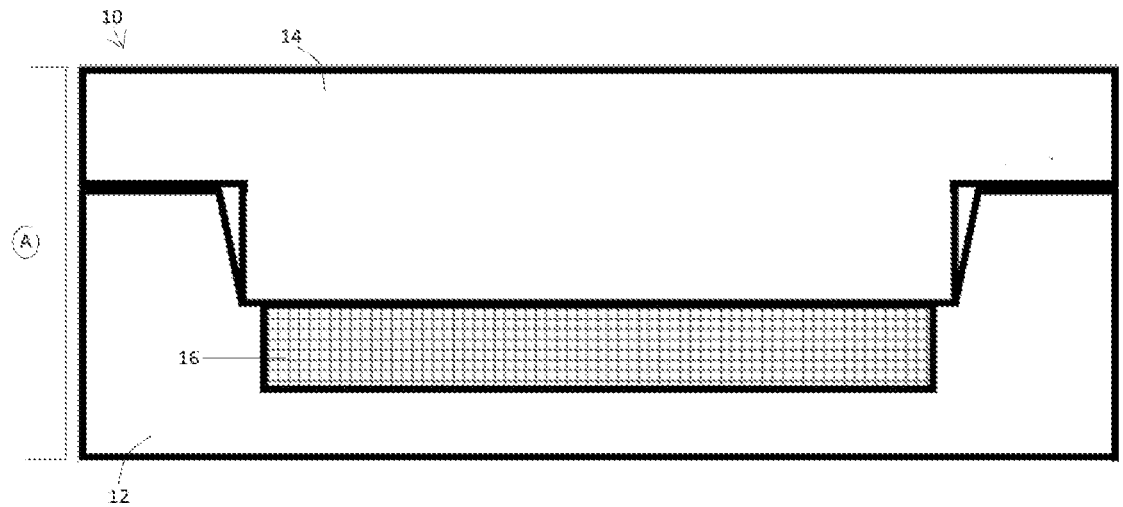

than 2, (iii) a strain hardening index greater than 2.5 to 6, and (iv) an extensional viscosity ($1\ s^{-1}$ at 180° C.) from greater than 400,000 Pa-s to 7,000,000 Pa-s. The process includes introducing the pliable formulation into a mold having an expandable mold cavity and unidirectionally expanding the expandable mold to form a crosslinked foam article. The process includes cooling, in the expanded mold, the crosslinked foam article; and removing the crosslinked foam article from the expandable mold.

7 Claims, 1 Drawing Sheet

(51) Int. Cl.
    *B29K 23/00*     (2006.01)
    *B29K 96/04*     (2006.01)
    *B29K 105/04*    (2006.01)
    *B29K 105/24*    (2006.01)
    *C08J 9/10*      (2006.01)

(52) U.S. Cl.
    CPC .... *B29K 2096/04* (2013.01); *B29K 2105/041* (2013.01); *B29K 2105/24* (2013.01); *B29K 2995/0063* (2013.01); *B29K 2995/007* (2013.01); *C08J 2201/026* (2013.01); *C08J 2203/04* (2013.01); *C08J 2353/00* (2013.01)

(58) Field of Classification Search
    CPC ....... B29K 2995/0063; B29K 2995/007; C08J 9/0023; C08J 9/103; C08J 2201/026; C08J 2203/04; C08J 2353/00; B29C 44/083; B29D 35/0036; B29D 35/0081; B29D 35/122
    See application file for complete search history.

(56) References Cited

U.S. PATENT DOCUMENTS

2019/0029950 A1   1/2019  Florence et al.
2019/0211199 A1*  7/2019  Zhang .................... C08L 53/00

FOREIGN PATENT DOCUMENTS

WO   2020/046717 A1   3/2020
WO   2020/056678 A1   3/2020

OTHER PUBLICATIONS

Laguna-Gutierrez et al. "Understanding the foamability and mechanical properties of foamed polypropylene blends by using extensional rheology" J. Appl. Polym. Sci. 2015 (Year: 2015).*

* cited by examiner

PROCESS FOR PRODUCING FOAM ARTICLE

BACKGROUND

Foam is widely used in consumer products such as footwear to provide a user with a degree of comfort and support during use. Foam contributes to weight reduction in footwear and reduced production costs compared to using non-foamed materials. Incumbent foam production methods such as injection phylon foaming and crosslinked injection foam molding require significant amounts of manual intervention to assemble separate footwear components. These conventional foam production processes also generate significant amounts of undesirable foam scrap.

Therefore, the art recognizes the need for improved processes for the production of foam articles, and in particular, for the production of foam articles in the footwear industry. Further recognized is the need for improved processes for the automated production of foam midsoles in combination with other components of a shoe.

SUMMARY

The present disclosure provides a process. In an embodiment, the process includes providing a foamable composition. The foamable composition includes an ethylene-based elastomer, a blowing agent, and a peroxide. The process includes heating the foamable composition to form a pliable formulation. The pliable formulation has (i) a viscosity (0.1 rad/s at 180° C.) from greater than 70,000 Pa·s to 2,000,000 Pa·s, (ii) a tan delta (0.1 rad/s at 180° C.) from 0.2 to less than 2, (iii) a strain hardening index greater than 2.5 to 6, and (iv) an extensional viscosity (1 $s^{-1}$ at 180° C.) from greater than 400,000 Pa-s to 7,000,000 Pa-s. The process includes introducing the pliable formulation into a mold having an expandable mold cavity and unidirectionally expanding the expandable mold to form a crosslinked foam article. The process includes cooling, in the expanded mold, the crosslinked foam article; and removing the crosslinked foam article from the expandable mold.

Definitions

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percentages are based on weight. For purposes of United States patent practice, the contents of any patent, patent application, or publication referenced herein are hereby incorporated by reference in their entirety (or the equivalent US version thereof is so incorporated by reference).

The numerical ranges disclosed herein include all values from, and including, the lower value and the upper value. For ranges containing explicit values (e.g., a range from 1, or 2, or 3 to 5, or 6, or 7) any subrange between any two explicit values is included (e.g., the range 1-7 above includes subranges from 1 to 2; from 2 to 6; from 5 to 7; from 3 to 7; from 5 to 6; etc.).

Unless stated to the contrary, implicit from the context, or customary in the art, all parts and percentages are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Elastomer" and like terms refer to a rubber-like polymer that can be stretched to at least twice its original length and which retracts very rapidly to approximately its original length when the force exerting the stretching is released. An elastomer has an elastic modulus of about 10,000 psi (68.95 MPa) or less and an elongation usually greater than 200% in the uncrosslinked state at room temperature using the method of ASTM D638-72.

An "ethylene elastomer" and like terms refer to an elastomer composed of an ethylene-based polymer.

An "ethylene-based polymer," as used herein is a polymer that contains more than 50 weight percent polymerized ethylene monomer (based on the total amount of polymerizable monomers) and, optionally, may contain at least one comonomer.

The term "foam," or "foam article," as used herein, is a structure constructed from a polymer; the structure includes a plurality of discrete gas pockets, or foam cells, completely surrounded by polymer. The term "foam cell," or "cell," as used herein, is a discrete space within the foam composition. The foam cell is separated, or otherwise is defined, by membrane walls composed of the polymer of the foam composition.

An "olefin-based polymer," or "polyolefin," as used herein is a polymer that contains more than 50 weight percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

Test Methods

Compression set is the amount of unrecoverable deformation after the removal of a compression of a certain percentage and duration and is measured in accordance with ASTM D395-B under conditions of 25% compression at room temperature for 24 hours. Three (3) buttons were tested per foam and the average was reported. The compression set was calculated 30 minutes and 24 hours after decompression via Equation (1) below:

Compression set=$(To-Ti)/(To-Tn)*100\%$    Equation (1)

wherein
Tn is the thickness of the space bars,
To is the original thickness of the foam button, and
Ti is the final thickness of the specimen after compression.

Density of foam article is calculated by measuring the dry weight, and the weight of a foam sample immersed in water with results reported in g/cc. The average weights of three foam specimens from one complete foam yield the density, ρ, via the following relationship (2):

$$\rho = \frac{\text{Average weight in air}}{\text{Average weight in deionized water}}$$    Relationship (2)

Density of polymer is measured in accordance with ASTM D792 with results reported in g/cc at 25° C.

Differential Scanning calorimetry (DSC) is used to measure the melting, crystallization, and glass transition behavior of a polymer over a wide range of temperature. For example, the TA Instruments Q2000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −80° C. at a 10° C./minute cooling rate and held isothermal at −80° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the following Equation: % Crystallinity=$((H_f)/292 \text{ J/g}) \times 100$.

The heat of fusion ($H_f$) (also known as melt enthalpy) and the peak melting temperature are reported from the second heat curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, *The Basis of Thermal Analysis, in Thermal Characterization of Polymeric Materials* 92, 277-278 (Edith A. Turi ed., 2d ed. 1997).

Glass transition temperature, Tg, is determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines are drawn from below and above the glass transition region and extrapolated through the Tg region. The temperature at which the sample heat capacity is half-way between these baselines is the Tg.

Elongation (ultimate) was measured according to ASTM D638 with a tensile speed of 500 mm/min.

Foam cell size and aspect ratio are determined as follows. A slice of approximately one centimeter in thickness was taken at least one centimeter from the foam border. The slice was taken in the plane of the foam growth direction, and was consequently divided in at least three similarly sized blocks. Samples were not taken from the center of the foam as the limited foam dimensions required the middle of the foam to be intact for other characterization methods. Foam samples were cut with a sharp blade to ensure a suitably smooth and uniform surface. For each foam sample, three cross-sectional images were recorded.

A confocal laser scanning microscope (Keyence VK-X260K) for 3D and profile measurements was equipped with a 10×/0.3 magnifying lens. All image acquisition was performed in Surface Profile mode with high accuracy quality and a standard resolution of 1024×768 pixels. As the cell sizes of the constrained foams were relatively large and there was no 5× magnification lens available, an automatic stitching procedure was performed to create a 2×2 stitched image of 1920×1441 pixels to provide a sufficient quantity of cells.

After image acquisition, filtering steps in the Multi File Analyzer v.2.1.2.17 software (Keyence) were required to obtain images with sufficient contrast for analysis. Depending on sample cutting quality, a plane fit correction was usually sufficient to correct any incline. For more difficult surface profile adjustments, surface shape corrections were recommended. User defined profiles can be specified in the secant curved surface (Image processing tool in surface shape correction tab) to eliminate height curvature. Subsequently, the images were converted to gray scale pallet and exported as an image format.

Two separate macros in FIJI software were developed and used to analyze the cell sizes, cell size distributions and aspect ratios. The foams that were created with the traditional Crosslinked Injection Molding method were analyzed with a macro that assumed thin cell walls and had a slightly lower cell size threshold. As "One-to-One" foamed samples have relatively large foam cells, adjustment was made for a thicker cell wall. Both macros follow several identical filtering and thresholding steps that were needed for bubble segmentation. These steps automatically lead to an interactive step where, if necessary, any missing cell walls could be manually drawn in. After verification whether all cells were correctly segmented, any unsatisfactory separated cells could be removed from the table.

Output of the macro includes a collection of parameters such as the area, various size descriptors and shape descriptors. The most representative descriptors define the cell size, cell size distribution and aspect ratio of the cells. Since the foam cells are generally not perfectly spherical, the aspect ratio represents how much the foam cells are elongated. The aspect ratio of the foam cells is determined by the macro by fitting an ellipse to a segmented foam cell, and defining the major and minor axis of the ellipse. The aspect ratio of the foam cell follows from Equation (3):

$$AR = \frac{[\text{major axis}]}{[\text{minor axis}]} \qquad \text{Equation (3)}$$

In order to describe the size of an anisotropic particle, here the distance between the two focus points, defined here as the 'cell size' was chosen. An ellipse has two focus points, which lie on the major axis with equal spacing from the ellipse center. For any point on the ellipse, the sum of the distances to the foci are always the same. An ellipse is partly defined by the location of the foci with respect to the ellipse center (the focal length), which can be calculated if the major and minor axis lengths are known. Defined in Equation 4 is the distance between the two foci as the cell size, which corresponds to twice the focal length.

$$\text{Foam Cell size} = 2\sqrt{\left(\frac{1}{2}[\text{major axis}]\right)^2 - \left(\frac{1}{2}[\text{minor axis}]\right)^2} \qquad \text{Equation (4)}$$

Melt flow rate (or MFR) measurement (for the propylene-based polymers) is performed according to ASTM D1238, Condition 230° C./2.16 kilogram (kg) weight. As with the melt index, the melt flow rate is inversely proportional to the molecular weight of the polymer. Thus, the higher the molecular weight, the lower the melt flow rate, although the relationship is not linear.

Melt index (MI or $I_2$) (for ethylene-based polymers) is measured in accordance with ASTM D 1238, Condition 190° C./2.16 kg with results reported in grams per 10 minutes (g/10 min).

Melt viscosity is measured using a Brookfield Viscometer Model, and a Brookfield RV-DV-II-Pro viscometer spindle 31 at 177° C. (or other identified temperature). The sample is poured into the chamber, which is, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams of resin) is heated to the required temperature, until the melted sample is about one inch below the top of the sample chamber. The viscometer apparatus is lowered, and the spindle submerged into the sample chamber. Lowering is continued, until the brackets on the viscometer align on the Thermosel. The viscometer is turned on, and set to operate at a shear rate, which leads to a torque reading in the range of 40 to 60 percent of the total torque capacity, based on the rpm output of the viscometer. Readings are taken every minute for about 15 minutes, or until the values stabilize, at which point, a final reading is recorded.

Rebound resilience is the ratio of the energy that is returned after application of a deformation with a particular energy. The rebound resilience measures the cushioning effect in athletic midsoles and is measured according to ASTM D-3574. A foam sample was placed underneath a tube with inner diameter 42 mm with indicated scale. A metal ball of 16 mm in diameter was dropped onto the sample. If the ball bounced back without touching the side of the cylinder, the height of the bounce was recorded. An average of five successful bounces was recorded for each sample Rheology. The rheological behavior, r, of the compounds modified with different concentrations of dicumyl peroxide is characterized. This included (A) shear rheology and (B) extensional viscosity.

(A) Shear Rheology

Compounded material with different loadings of polymer and peroxide only, (without other additives, see Table 2) were compression molded and cured in a Lab Tech Press LP-S-80. Stacks of roll milled compound were preheated inside the molding press for 2 minutes at 180° C. at 10 bar, and consequently fully pressed at 120 bar for 8 minutes to a thickness of 2 mm. After complete pressing and curing, the samples are gradually cooled inside the press to 40° C. before removing from the molding plates.

At least 24 hours after compression molding, disks with a diameter of 8 mm were punched from the cured sheets with a cutting die. Shear rheology is measured in a TA instruments HR-2 rheometer with temperature chamber cooled with nitrogen. All samples are first subjected to a strain amplitude sweep experiment at 25° C. at an angular frequency of 10 radians per second (rad/s) from 0.01 to 10% to determine the location of the linear viscoelastic regime. Based on that information, a suitable strain amplitude are chosen to perform the frequency sweeps.

Frequency sweeps are then measured at, 130, 150 and 180° C. to correspond with the temperatures of the extensional rheology. Frequency sweeps are taken as a logarithmic sweep between 100 and 0.1 rad/s, this means that the datapoints were recorded with equal spacing on a logarithmic scale.

(B) Extensional Rheology

Square plates with a thickness of 0.5 mm are compression molded and cured in a Lab Tech Press LP-S-80. The compounds are compressed in a Teflon coated mold using the following layers: press plate, aluminum plate, aluminum foil, Teflon coated mold with sample, aluminum foil, aluminum plate, press plate. Sheets were preheated at 180° C. for 180 seconds at 10 bar, followed by a full compression for 360 s at 120 bar. The sheets are cooled at a constant cooling rate to 40° C.

For the uniaxial extensional rheology experiments, rectangular test specimen with dimensions 13×12.7 mm were cut out from the cured sheet with a cutting die. Dimensions were also measured for each individual sample with a caliper tool and fed into the rheometer software for each individual measurement. The experiments were performed on an Anton Paar MCR 702 with a Convection Temperature Control Device (CTD) 450 oven attached with a Universal Extensional Fixture (UXF) tool. The measurements are performed at three different extensional strain rates (0.1, 1 and 10 s−1) at three different temperatures (130, 150 and 180° C.). Prior to the test procedure, a pre-stretch is performed at the corresponding strain rate. Data-points were recorded at logarithmically spaced time intervals. At each of these intervals with corresponding Hencky strains, this yields a measure for the extensional stress and the extensional viscosity. The extensional viscosity that is representative for conditions during foaming was found at strain rate of 1 s$^{-1}$ and a Hencky strain of 2. The strain hardening index is the balance between the extensional viscosity at a particular time and strain rate $\eta_E^+(t)$, and the extensional viscosity that would be observed if there would be no strain hardening. The strain hardening index (SHI) is calculated at these conditions via Equation (5):

$$\text{SHI}=\eta_E^+(t)/(3\eta_s^*(at\omega=1/t)) \qquad \text{Equation (5)}$$

wherein $\eta_E^+(t)$, is the extensional viscosity (in Pascal-seconds (Pa·s)) measured at a Hencky strain of 2 and a strain rate of 1 s$^{-1}$, which is reached at time=2 s; and $(3\eta_s^*(\text{at } \omega=1/t))$ is the shear complex viscosity (in Pa·s) measured at a frequency of ½.

Shore A hardness. The hardness is an average of five readings (5 seconds latency) measured across the surface of the sample following ASTM D2240.

DETAILED DESCRIPTION

The present disclosure provides a process. In an embodiment, the process includes providing a foamable composition. The foamable composition includes an ethylene-based elastomer, a blowing agent, and a peroxide (and optional additives). The process includes heating the foamable composition to form a pliable formulation having (i) a viscosity (0.1 rad/s at 180° C.) from greater than 70,000 Pa·s to 2,000,000 Pa·s,
(ii) a tan delta (0.1 rad/s at 180° C.) from 0.2 to less than 2,
(iii) a strain hardening index greater than 2.5 to 6,
(iv) an extensional viscosity (1 s$^{-1}$ at 180° C.) from greater than 400,000 Pa-s to 7,000,000 Pa-s. The process includes introducing the pliable formulation into a mold having an expandable mold cavity and unidirectionally expanding the expandable mold to form a crosslinked foam article. The process includes cooling, in the expanded mold, the crosslinked foam article; and removing the crosslinked foamed article from the expandable mold.

A. Foamable Composition

The process includes providing a foamable composition. The term "foamable composition," as used herein, is a mixture of (i) an ethylene-based elastomer, (ii) a blowing agent, (iii) a peroxide, and (iv) optional additives. The final crosslinked foam article is the resultant product of the foamable compositions being subjected to a foaming process.

The ethylene-based elastomer is selected from ethylene vinyl acetate (EVA), polyolefin elastomer, an ethylene/α multi-block copolymer, and combinations thereof.

In an embodiment, the ethylene-based elastomer is an ethylene/α-olefin multi-block copolymer. The term "ethylene/α-olefin multi-block copolymer" refers to an ethylene/ $C_4$-$C_8$ α-olefin multi-block copolymer consisting of ethylene and one copolymerizable $C_4$-$C_8$ α-olefin comonomer in polymerized form (and optional additives), the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. Ethylene/α-olefin multi-block copolymer includes block copolymer with two blocks (di-block) and more than two blocks (multi-block). The $C_4$-$C_8$ α-olefin is selected from butene, hexene, and octene. The ethylene/α-olefin multi-block copolymer is void of, or otherwise excludes, styrene (i.e., is styrene-free), and/or vinyl aromatic monomer, and/or conjugated diene.

When referring to amounts of "ethylene" or "comonomer" in the copolymer, it is understood that this refers to polymerized units thereof. In some embodiments, the ethylene/α-olefin multi-block copolymer can be represented by the following formula: (AB)$_n$; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the ethylene/α-olefin multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

In an embodiment, ethylene comprises the majority mole fraction of the whole ethylene/α-olefin multi-block copolymer, i.e., ethylene comprises at least 50 wt % of the whole ethylene/α-olefin multi-block copolymer. More preferably, ethylene comprises at least 60 wt %, at least 70 wt %, or at least 80 wt %, with the substantial remainder of the whole ethylene/α-olefin multi-block copolymer comprising the $C_4$-$C_8$ α-olefin comonomer. In an embodiment, the ethylene/α-olefin multi-block copolymer contains 50 wt % to 90 wt % ethylene, or 60 wt % to 85 wt % ethylene, or 65 wt % to 80 wt % ethylene. For many ethylene/octene multi-block copolymers, the composition comprises an ethylene content greater than 80 wt % of the whole ethylene/octene multi-block copolymer and an octene content of from 10 wt % to 15 wt %, or from 15 wt % to 20 wt % of the whole multi-block copolymer.

The ethylene/α-olefin multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, greater than 10 wt %, or greater than 15 wt %, based on the weight of the polymer. In an embodiment, the comonomer content in the soft segments is greater than 20 wt %, greater than 25 wt %, greater than 30 wt %, greater than 35 wt %, greater than 40 wt %, greater than 45 wt %, greater than 50 wt %, or greater than 60 wt % and can be up to 100 wt %.

The soft segments can be present in an ethylene/α-olefin multi-block copolymer from 1 wt % to 99 wt % of the total weight of the ethylene/α-olefin multi-block copolymer, or from 5 wt % to 95 wt %, from 10 wt % to 90 wt %, from 15 wt % to 85 wt %, from 20 wt % to 80 wt %, from 25 wt % to 75 wt %, from 30 wt % to 70 wt %, from 35 wt % to 65 wt %, from 40 wt % to 60 wt %, or from 45 wt % to 55 wt % of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-Polymers," filed on Mar. 15, 2006, in the name of Colin L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in column 57 to column 63 of U.S. Pat. No. 7,608,668.

The ethylene/α-olefin multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In one embodiment of this disclosure, ethylene/α-olefin multi-block copolymers are defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$Tm > -2002.9 + 4538.5(d) - 2422.2(d)^2$, and/or (B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$\Delta T > -0.1299 \Delta H + 62.81$ for ΔH greater than zero and up to 130 J/g $\Delta T \geq 48°$ C. for ΔH greater than 130 J/g wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$Re > 1481 - 1629(d)$; and/or (D) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G'(100° C.), wherein the ratio of G'(25° C.) to G'(100° C.) is in the range of 1:1 to 9:1.

The ethylene/α-olefin multi-block copolymer may also have:

(F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3.

It is understood that the ethylene/α-olefin multi-block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, col. 31 line 26 through col. 35 line 44, which is herein incorporated by reference for that purpose.

In an embodiment, the ethylene/α-olefin multi-block copolymer has hard segments and soft segments, is styrene-free, consists of only (i) ethylene and (ii) a $C_4$-$C_8$ α-olefin or $C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2,$$

where the density, d, is from 0.850 g/cc, or 0.860 g/cc, or 0.870 g/cc to 0.875 g/cc, or 0.877 g/cc, or 0.880 g/cc, or 0.890 g/cc; and the melting point, Tm, is from 110° C., or 115° C., or 120° C. to 125° C., or 130° C., or 135° C.

In an embodiment, the ethylene/α-olefin multi-block copolymer is an ethylene/1-octene multi-block copolymer (consisting only of ethylene and octene comonomer) and has one, some, or all of the following properties:
  (i) a Mw/Mn from 1.7, or 1.8 to 2.2, or 2.5, or 3.5; and/or
  (ii) a density from 0.860 g/cc, or 0.865 g/cc, to 0.870 g/cc, or 0.877 g/cc, or g/cc; and/or
  (iii) a melting point, Tm, from 115° C., or 118° C., or 119° C., or 120° C. to 120° C., or 123° C., or 125° C.; and/or
  (iv) a melt index (MI) from 0.1 g/10 min, or 0.5 g/10 min to 1.0 g/10 min, or 2.0 g/10 min, or 5 g/10 min, or 10 g/10 min; and/or
  (v) from 50 to 85 wt % soft segment and from 40 to 15 wt % hard segment (based on total weight of the ethylene/octene multi-block copolymer); and/or
  (vi) from 10 mol %, or 13 mol %, or 14 mol %, or 15 mol % to 16 mol %, or 17 mol %, or 18 mol %, or 19 mol %, or 20 mol % octene in the soft segment; and/or
  (vii) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or
  (viii) an elastic recovery (Re) from 50%, or 60% to 70%, or 80%, or 90%, at 300% min$^{-1}$ deformation rate at 21° C. as measured in accordance with ASTM D 1708; and/or
  (ix) a polydisperse distribution of blocks and a polydisperse distribution of block sizes (hereafter referred to as multi-block copolymer properties (i)-(ix)).

In an embodiment, the ethylene/α-olefin multi-block copolymer is an ethylene/octene multi-block copolymer. The ethylene/octene multi-block copolymer is sold under the tradename INFUSE™, available from The Dow Chemical Company, Midland, Michigan, USA.

The ethylene/α-olefin multi-block copolymer can be produced via a chain shuttling process such as described in U.S. Pat. No. 7,858,706, which is herein incorporated by reference. In particular, suitable chain shuttling agents and related information are listed in col. 16 line 39 through col. 19 line 44. Suitable catalysts are described in col. 19 line 45 through col. 46 line 19 and suitable co-catalysts in col. 46 line 20 through col. 51 line 28. The process is described throughout the document, but particularly in col. 51 line 29 through col. 54 line 56. The process is also described, for example, in the following: U.S. Pat. Nos. 7,608,668; 7,893,166; and 7,947,793.

The base ethylene/α-olefin multi-block copolymer may include more than one ethylene/α-olefin multi-block copolymer.

The foamable composition includes a blowing agent. The blowing agent can be a physical blowing agent or a chemical blowing agent. Nonlimiting examples of suitable physical blowing agent include nitrogen, carbon dioxide, hydrocarbons (e.g., propane), chlorofluorocarbons, noble gasses, and combinations thereof.

In an embodiment, the blowing agent is a chemical blowing agent. The chemical blowing agent generates one or more gasses, by thermal decomposition in the foaming process. Chemical blowing agents include (but are not limited to) sodium bicarbonate, sodium borohydride, azodicarbonamide, azodiisobutyro-nitrile, barium azodicarboxylate, N,N'-dimethyl-N,N'-dinitrosoterephthalamide, and benzenesulfonhydrazide, 4,4-oxybenzene sulfonyl semicarbazide, 4,4'-oxybis(benzenesulfonicacid)dihydrazide, and p-toluene sulfonyl semicarbazide, trihydrazino triazine and mixtures such as those of citric acid and sodium bicarbonate.

In an embodiment, the chemical blowing agent is azodicarbonamide.

The foamable composition includes a peroxide, such as an organic peroxide. The peroxide is the crosslinking agent in the foamable composition. Non-limiting examples of suitable organic peroxide include alkyl peroxides, aryl peroxides, peroxyesters, peroxycarbonates, diacylperoxides, peroxyketals, cyclic peroxides and combinations thereof.

In an embodiment, the organic peroxide is dicumyl peroxide, t-butylisopropylidene peroxybenzene, 1,1-di-t-butyl peroxy-3,3,5-trimethylcyclohexane, 2,5-dimethyl-2,5-di(t-butyl peroxy) hexane, t-butyl-cumyl peroxide, di-t-butyl peroxide, 2,5-dimethyl-2,5-di-(t-butyl peroxy) hexyne or a combination thereof.

In an embodiment, the organic peroxide is dicumyl peroxide.

The foamable composition includes one or more optional additives. Nonlimiting examples of suitable additives include blowing agent activator (zinc oxide, zinc stearate, zinc sulfide), stability control agent, nucleating agent, filler (talc, calcium carbonate, nanoclay, carbon nanotube, carbon nanofiber), pigment (zinc oxide), antioxidant, an acid scavenger, UV stabilizer, flame retardant, lubricant, processing aid, extrusion aid, and combinations thereof.

The components of the foamable composition are mixed in a mixer or an extruder for uniform dispersion of the blowing agent, peroxide, and optional additive(s) throughout the ethylene-based elastomer matrix. The foamable composition is pelletized, cut into small pieces, or cut into a pre-determined shape for introduction into a mold for foaming.

In an embodiment, the ethylene-based elastomer, chemical blowing agent, organic peroxide, and optional additives are melt-mixed in an internal mixer to melt the polymer and to blend the chemical blowing agent, organic peroxide, and optional additives into the melt-mix. The melt-mix is cut into a pre-determined shape (i.e., a shape to completely cover the bottom of a mold cavity) and introduced into a mold cavity as further described below.

The process includes heating the foamable composition. Heating occurs by placing pellets (or piece(s)) of the foamable composition (i) in an oven, (ii) in a mold, or (iii) a combination of (i) and (ii). Heating is controlled such that heating occurs at sufficient elevated temperature (greater than ambient temperature, or greater than 25° C.) for a sufficient duration of time to form the foamable composition into a pliable formulation so not to decompose the blowing agent and not to decompose the peroxide present in the pliable formulation. Heating of the foamable composition forms a pliable formulation (composed of the components of the foamable composition) and having the following properties:
  (i) a viscosity (0.1 rad/s at 180° C.) from greater than 70,000 Pa·s to 2,000,000 Pa·s,
  (ii) a tan delta (0.1 rad/s at 180° C.) from 0.2 to less than 2,
  (iii) a strain hardening index greater than 2.5 to 6, and
  (iv) an extensional viscosity (1 s$^{-1}$ at 180° C.) from greater than 400,000 Pa-s to 7,000,000 Pa-s.

The process includes introducing the pliable formulation into a mold having an expandable mold cavity. As shown in FIG. 1, a mold 10 includes a housing 12 and a movable part 14 in reciprocal and operative communication with housing 12. Movable part 14 moves unidirectionally, that is movement along the z-axis only. The operation between movable part 14 and housing 12 permits no movement in the x-axis and permits no movement in the y-axis. FIG. 1 shows pliable formulation 16 in the mold cavity and movable part 14 in a first position A that is a closed position. With movable part 14 in the closed position, mold 10 is heated to a temperature to kick-off or otherwise initiate the peroxide (a temperature to decompose the peroxide) and kick-off or otherwise initiate the chemical blowing agent (when a chemical blowing agent is used). In an embodiment, pressure (positive pressure or negative pressure) is also applied to the mold cavity when movable part 14 is in the closed position A so as to remove any air present in the mold cavity and/or remove any air present in the pliable formulation 16.

Figure 2:
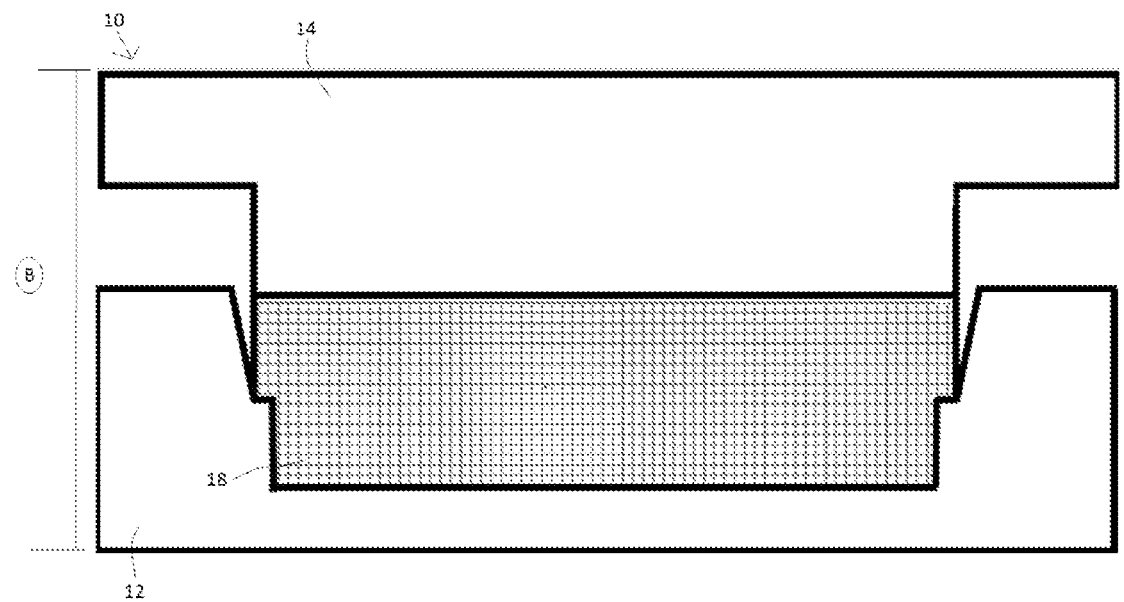

The process includes unidirectionally expanding the expandable mold to form a crosslinked foam article. FIG. 2 shows movable part 14 moved to a second position B, or otherwise an expanded position. Moving movable part 14 to the expanded position B expands, or otherwise increases, the volume of the mold cavity, thereby triggering the pliable formulation to expand and foam. The expanding and foaming pliable formulation fills, or completely fills, the expanded volume of the mold cavity and forms a crosslinked foam article 18. The resultant crosslinked foam article 18 takes the shape of the expanded mold cavity. As mentioned above, movable part 14 moves along the z-axis only, thereby restricting the expansion of the foaming pliable formulation in a single axis, along the z-axis only. During expanding and foaming the pliable formulation 16 (and resultant crosslinked foam article 18) is/are not exposed to the ambient environment. The unidirectional mold expansion forms anisotropic cells in the crosslinked foam article. An "anisotropic cell," is a foam cell having an asymmetric shape, whereby the length of the cell is larger in one dimension than the length of the cell in the other dimensions.

The process includes cooling the crosslinked foam article 18 in the expanded mold. Cooling occurs with movable part 14 remaining at expanded position B. Cooling is conducted for a time duration sufficient for the crosslinked foam article to solidify and to set. In an embodiment, the process includes cooling the crosslinked foam article to a temperature from 15° C. to 25° C.

The process forms a crosslinked foam article 18 having one, some, or all of the following properties:
(i) an average cell size 150 microns to 275 microns, and/or
(ii) an average aspect ratio from 1.5 to 2.0, and/or
(iii) a density (with skin) from 0.170 g/cc to 0.250 g/cc, and/or
(iv) a compression set (24 hr) 5% to less than 10%, and/or
(v) a Shore A hardness 10 to 25, and/or
(vi) a rebound resilience 30% to 50%.

In an embodiment, the process includes
providing a foamable composition comprising
(i) from 88 wt % to 90 wt % of an ethylene-based elastomer that is an
ethylene/octene multi-block copolymer having a density from 0.870 g/cc to 0.89 g/cc and a melt index from 1.0 g/10 min to 5.0 g/10 min or 5.0 g/10 min,
(ii) a chemical blowing agent, and
(iii) from 0.5 wt % to 3.0 wt %, or from 0.7 wt % to 2.7 wt % of an organic peroxide. Weight percent is based on total weight of the foamable composition. The process includes heating the foamable composition to form a pliable formulation having
(i) a viscosity (0.1 rad/s at 180° C.) from greater than 70,000 Pa·s to 2,000,000 Pa·s,
(ii) a tan delta (0.1 rad/s at 180° C.) from 0.2 to less than 2,
(iii) a strain hardening index greater than 2.5 to 6,
(iv) an extensional viscosity ($1$ $s^{-1}$ at 180° C.) from greater than 400,000 Pa·s to 7,000,000 Pa·s. The process further includes introducing the pliable formulation into a mold having an expandable mold cavity;

unidirectionally expanding the expandable mold to form a crosslinked foam article;

cooling, in the expanded mold, the crosslinked foam article; and forming a crosslinked foam article having
(i) an average cell size 150 microns to 275 microns, or from 200 microns to 260 microns, and/or
(ii) an average aspect ratio from 1.5 to 2.0, or from 1.7 to 1.9 and/or
(iii) a density (with skin) from 0.170 g/cc to 0.250 g/cc, and/or
(iv) a compression set (24 hr) 5% to less than 10%, and/or
(v) a Shore A hardness 10 to 25, and/or
(vi) a rebound resilience from 30% to 50% (hereafter referred to as foam 1).

In an embodiment, the process includes placing a shoe part (such as a pre-foamed part) in the mold cavity and introducing the pliable formulation with previously-described properties (i)-(iv) on, and in direct contact with, the pre-foamed part. The process includes performing heating, unidirectionally expanding, cooling, and forming a crosslinked foam article (foam 1) directly onto the pre-foamed part. In this way foam 1 is foamed onto, or otherwise fused onto, the pre-foamed part.

The present crosslinked foam article can be molded and shaped as an article of footwear or incorporated into an article of footwear. Nonlimiting examples of suitable footwear articles for the present crosslinked foam article include an outsole, a midsole, an insole, and combinations thereof.

By way of example, and not limitation, some embodiments of the present disclosure are described in detail in the following examples.

Examples

The raw materials used in the preparation for the present crosslinked foam composition, the adhesive layer, and the substrate in the Inventive Examples ("IE") are provided in Table 1 below.

TABLE 1

| Starting materials for the foam | | |
|---|---|---|
| Component | Specification | Source |
| INFUSE ™ 9100 | Ethylene/octene multi-block copolymer, density: 0.877 g/cc; MI: 1.0 g/10 min, Tm: 120° C. | The Dow Chemical Company |
| INFUSE ™ 9500 | Ethylene/octene multi-block copolymer, density: 0.877 g/cc; MI: 5.0 g/10 min, Tm: 122° C. | The Dow Chemical Company |

TABLE 1-continued

Starting materials for the foam

| Component | Specification | Source |
|---|---|---|
| Luperox DC40P | Crosslinking agent, Dicumylperoxide ((40%) blended with an inert filler and scorch protected) | Arkema |
| Luvobatch BA 5332 | Chemical Blowing agent, azodicarbonamide (40%) | Lehvoss |
| Omyalite 95T | Filler, Ca $CO_3$ (powder) | OMYA AG Switzerland |
| Zinc Oxide (ZnO) | Blowing agent activator, CAS: 1314-13-2 | Brenntag Schweizerhall AG |
| Zinc Stearate (ZnSt) | Blowing agent activator, CAS: 557-05-1 | Brenntag Schweizerhall AG |

1. Composition Preparation

INFUSE™ 9100 or INFUSE™ 9500 (ethylene-based elastomer that is ethylene/octene multi-block copolymer) is added onto a Colin Roll mill with the front roll at 130° C. and the back roll at 125° C. and a rotation speed of 8 rounds per minute (rpm). Zinc oxide, zinc stearate and $CaCO_3$ filler subsequently are added upon complete melting of the ethylene/octene multi-block copolymer. The blowing agent and peroxide are added last after the fillers and blowing agent activators are uniformly incorporated into the ethylene/octene multi-block copolymer to form the foamable composition. The foamable compositions are provided in Table 2 below.

TABLE 2

Foamable Compositions

| Component | IE1 Parts/wt | IE2 Parts/wt | IE3 Parts/wt | CS-1 Parts/wt | CS-2 Parts/wt | CS-3 Parts/wt | IE-4/CS-4 Parts/wt | IE-5/CS-5 Parts/wt | IE-5/CS-6 Parts/wt |
|---|---|---|---|---|---|---|---|---|---|
| INFUSE ™ 9500 | 100 | 100 | 100 | 0 | 0 | 0 | 100 | 100 | 100 |
| INFUSE ™ 9100 | 0 | 0 | 0 | 100 | 100 | 100 | | | |
| Luperox DC40P-SP2 | 0.5 | 1 | 1.5 | 2 | 2.5 | 3 | 2 | 2.5 | 3 |
| Luvobatch BA 5332 | 5 | 5 | 5 | 5 | 5 | 5 | 5 | 5 | 5 |
| ZnO | 0.3 | 0.3 | 0.3 | 0.3 | 0.3 | 0.3 | 0.3 | 0.3 | 0.3 |
| ZnSt | 0.3 | 0.3 | 0.3 | 0.3 | 0.3 | 0.3 | 0.3 | 0.3 | 0.3 |
| Omyalite 95T | 5 | 5 | 5 | | | | 5 | 5 | 5 |

CS—comparative sample,
IE—inventive example

2. Foaming Procedure

The foaming procedures for the comparative samples (CS) and the inventive examples (IE) are provided in Table 3 below.

TABLE 3

Foaming procedures for comparative samples and inventive examples

| Comparative samples | Inventive examples |
|---|---|
| 1. An amount of a CS composition from Table 1 was weighed to completely fill the mold volume as shown in FIG. 1. | 1. An amount of an IE composition from Table 1 was weighed to fill completely the bottom compartment of the mold as shown in FIG. 1. The IE composition was heated in the mold for 15 minutes at 110° C. until it was sufficiently pliable and form the IE pliable formulation. |
| 2. The CS composition then was removed from the mold and was heated for 10 minutes at 110° C. in an oven to soften and form the CS pliable formulation. | 2. The IE pliable formulation was transferred to a molding ring (inner diameter of 120 mm and height of 8 mm) and compression molded in a Colin Table press P 200E for 5 minutes at 120° C. between silicone paper to form the pre-mold. |
| 3. The mold was heated (to 180° C.) and was treated with silicone release agent, which was sprayed on the hot mold interior surfaces, the release agent cured for 20 minutes to prevent sticking of the foam upon opening of the mold. | 3. The pre-mold was heated a second time, this time in an oven at 110° C. for 15 minutes. |
| 4. The CS pliable formulation was removed from the oven and placed in the open mold, making sure that the mold surface was covered as well as possible. | 4. After the second heating, the pre-mold was transferred to the mold and pressed tightly in the mold cavity to ensure the absence of air in the mold cavity. |
| 5. The heated mold (180° C.) was closed for 10 minutes to allow for curing and decomposition of the blowing agent under a pressure of 150 bar. A vacuum was applied to ensure proper filling of the mold cavity. | 5. After closing the mold, the pre-mold was compressed inside the molding cavity at 180° C. at 150 bar for 11 minutes to allow for curing and decomposition of the blowing agent. |

TABLE 3-continued

Foaming procedures for comparative samples and inventive examples

| Comparative samples | Inventive examples |
|---|---|
| 6. After 10 minutes, the mold was fully opened upon which rapid foam expansion occurred in all directions (x-axis, y-axis, z-axis), ejecting the foam from the mold. The crosslinked foam material was recovered and cooled in a fume hood. | 6. After 11 minutes, the mold was then opened to an expansion ratio of 3.75, permitting expansion unidirectionally, in the z-axis only, as shown in FIG. 2. |
|  | 7. The mold was cooled to room temperature and the crosslinked foam article removed from the mold. |

Table 4 provides properties for foamable compositions, pliable formulations, and inventive crosslinked foam articles and comparative samples.

TABLE 4

|  | CS-A wt % | IE2 wt % | IE3 wt % | IE4 wt % | IE5 wt % | IE6 wt % | CS-1 wt % |
|---|---|---|---|---|---|---|---|
| Component |  |  |  |  |  |  |  |
| INFUSE ™ 9500 | 90.01 | 89.61 | 89.21 | 88.81 | 88.42 | 88.03 |  |
| INFUSE ™ 9100 |  |  |  |  |  |  | 88.81 |
| Luperox DC40P-SP2 | 0.45 | 0.90 | 1.34 | 1.78 | 2.21 | 2.64 | 1.78 |
| Luvobatch BA 5332 | 4.50 | 4.48 | 4.46 | 4.44 | 4.42 | 4.40 | 4.44 |
| ZnO | 0.27 | 0.27 | 0.27 | 0.27 | 0.27 | 0.26 | 0.27 |
| ZnSt | 0.27 | 0.27 | 0.27 | 0.27 | 0.27 | 0.26 | 0.27 |
| Omyalite 95T | 4.50 | 4.48 | 4.46 | 4.44 | 4.42 | 4.40 | 4.44 |
| Pliable formulation |  |  |  |  |  |  |  |
| $\eta S^*$ (Pa · s) at 0.1 rad/s 180° C. | 25667.4 | 71326.2 | 261771 | 572573 | 759010 | 1192470 | 1737030 |
| Tandelta at 0.1 rad/s 180° C. | 3.04 | 1.38 | 0.70 | 0.40 | 0.34 | 0.26 | 0.25 |
| $\eta E^+$ (Pa · s) at $\varepsilon H = 2$ 180° C. | 54976 | 406300 | 784150 | 1731600 | 2416100 | 5099500 | 5393700 |
| SHI 180° C. | 1.04 | 3.70 | 2.76 | 3.36 | −3.72 | −5.29 | 3.95 |
| Foam part |  |  |  |  |  |  |  |
| Ave cell size | 277 | 257 | 229 | 249 | 206 | 178 | 124 |
| Ave aspect ratio | 1.60 | 1.72 | 1.82 | 1.88 | 1.82 | 1.77 | 1.63 |
| Density w/skin | — | 0.194 | 0.226 | 0.215 | 0.234 | 0.234 | 0.191 |
| Density w/o skin | 0.201 | 0.136 | — | 0.134 | 0.139 | 0.163 | 0.178 |
| Compression set 30 min | 12.2 | 14.4 | 24.6 | 17.9 | 17.7 | 15.5 | 37.0 |
| Compression set 24 hr | 9.1 | 9.6 | 8.8 | 6.5 | 6.9 | 8.9 | 4.2 |
| Shore A | 12.6 | 15.9 | 20.4 | 16.9 | 20.6 | 23.6 | 16.5 |
| Rebound resilience | 49.5 | 45.2 | 38.5 | 41.3 | 39.3 | — | 50.8 |
| Split tear | — | — | 1.4 | 1.8 | 1.9 | 1.9 | 1.9 |

|  | CS-2 wt % | CS-3 wt % | CS-4 wt % | CS-5 wt % | CS-6 wt % |
|---|---|---|---|---|---|
| Component |  |  |  |  |  |
| INFUSE ™ 9500 |  |  | 88.81 | 88.42 | 88.03 |
| INFUSE ™ 9100 | 88.42 | 88.03 |  |  |  |
| Luperox DC40P-SP2 | 2.21 | 2.64 | 1.78 | 2.21 | 2.64 |
| Luvobatch BA 5332 | 4.42 | 4.40 | 4.44 | 4.42 | 4.40 |
| ZnO | 0.27 | 0.26 | 0.27 | 0.27 | 0.26 |
| ZnSt | 0.27 | 0.26 | 0.27 | 0.27 | 0.26 |
| Omyalite 95T | 4.42 | 4.40 | 4.44 | 4.42 | 4.40 |
| Pliable formulation |  |  |  |  |  |
| $\eta S^*$ (Pa · s) at 0.1 rad/s 180° C. | 2369680 | 2877680 | 572573 | 759010 | 1192470 |
| Tandelta at 0.1 rad/s 180° C. | 0.19 | 0.16 | 0.40 | 0.34 | 0.26 |

TABLE 4-continued

|  | | | | | |
|---|---|---|---|---|---|
| ηE+ (Pa · s) at εH = 2 180° C. | — | — | 1731600 | 2416100 | 5099500 |
| SHI 180° C. | — | — | 3.36 | −3.72 | −5.29 |
| Foam part | | | | | |
| Ave cell size | 116 | 104 | 120 | 107 | 94 |
| Ave aspect ratio | 1.65 | 1.66 | 1.58 | 1.58 | 1.61 |
| Density w/skin | 0.220 | 0.255 | 0.152 | 0.152 | 0.174 |
| Density w/o skin | 0.187 | 0.226 | 0.136 | 0.142 | 0.163 |
| Compression set 30 min | 32.3 | 24.2 | 46.2 | 36.6 | 22.7 |
| Compression set 24 hr | 5.6 | 6.6 | 8.5 | 6.4 | 6.7 |
| Shore A | 19.2 | 24.5 | 8.7 | 10.6 | 14.8 |
| Rebound resilience | 49.2 | 47.5 | 52.7 | 51.7 | 50.8 |
| Split tear | 2.0 | 2.1 | 1.2 | 1.5 | 1.6 |

IE = inventive example,
CS = comparative sample

The present process enables the production of crosslinked foam article using lower levels of peroxide from (0.5 wt % to 3.0 wt %, or from 0.7 wt % to 2.7 wt %) and still achieving suitable foam properties for use in footwear, and for use in midsoles in particular. The present process also produces inventive examples of crosslinked foam article having a greater aspect ratio (1.72-1.88) in combination with greater average cell size (206-257 microns) than the comparative samples (aspect ratio 1.58-1.65 and average cell size 94-277 microns).

The present process enables the production of a crosslinked foam article in a single (one-to-one) foaming step without the need for an additional foam compression step as in a phylon foaming process, for example. A foam part can be placed into the mold cavity, onto which the present pliable formulation is placed and subsequently unidirectionally foamed and crosslinked for direct foaming of the instant crosslinked foam article onto the pre-inserted foam part.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A process comprising:
providing a foamable composition comprising an ethylene-based elastomer, a blowing agent, and a peroxide;
heating the foamable composition to form a pliable formulation having
(i) a viscosity measured at 0.1 rad/s at 180° C. from greater than 70,000 Pa·s to 2,000,000 Pa·s,
(ii) a tan delta measured at 0.1 rad/s at 180° C. from 0.2 to less than 2,
(iii) a strain hardening index greater than 2.5 to 6,
(iv) an extensional viscosity measured at 1 s$^{-1}$ at 180° C. from greater than 400,000 Pa-s to 7,000,000 Pa-s;
introducing the pliable formulation into a mold having an expandable mold cavity;
unidirectionally expanding the expandable mold cavity to form a crosslinked foam article;
cooling, in the expanded mold cavity, the crosslinked foam article;
removing the crosslinked foam article from the expandable mold cavity; and
forming a crosslinked foam article having an average aspect ratio from 1.7 to 1.9.

2. The process of claim 1 comprising removing, before the expanding, air from the mold cavity.

3. The process of claim 1 comprising
forming the crosslinked foam article having
(i) an average cell size from 150 microns to 275 microns, or
(ii) a density with skin from 0.170 g/cc to 0.250 g/cc, or
(iii) a compression set after 24 hours from 5% to less than 10%, or
(iv) a Shore A hardness from 10 to 25, or
(v) a rebound resilience from 30% to 50%.

4. The process of claim 3 comprising
providing the foamable composition comprising
from 88 wt % to 90 wt % of the ethylene-based elastomer that is an ethylene/octene multi-block copolymer having a density from 0.870 g/cc to 0.890 g/cc and a melt index from 1.0 g/10 min to 5.0 g/10 min,
the blowing agent, and
from 0.5 wt % to 3.0 wt % of the peroxide comprising an organic peroxide;
a first step of heating the foamable composition to form the pliable formulation;
a second heating step to heat the pliable formulation;
introducing the pliable formulation into the mold having the expandable mold cavity;
closing the mold and a third heating step to heat the pliable formulation in the closed mold;
opening the mold and unidirectionally expanding in the z-axis only the expandable mold cavity to form the crosslinked foam article; and
forming the crosslinked foam article having
(i) an average cell size 150 microns to 275 microns, and
(ii) an average aspect ratio from 1.7 to 1.9, and
(iii) a density with skin from 0.170 g/cc to 0.250 g/cc, and
(iv) a compression set after 24 hours from 5% to less than 10%, and
(v) a Shore A hardness 10 to 25, and
(vi) a rebound resilience from 30% to 50%.

5. The process of claim 1 comprising: the heating comprises heating the foamable composition at a temperature of 110° C. for 15 minutes to form the pliable formulation.

6. The process of claim 5 comprising a second step of heating comprises heating the pliable formulation in an oven at a temperature of 110° C. for 15 minutes.

7. The process of claim 6 comprising
placing a pre-foamed part in the expandable mold cavity;
introducing the pliable formulation in direct contact with the pre-foamed part; and
forming the crosslinked foam article directly onto the pre-foamed part.

* * * * *